(12) United States Patent  (10) Patent No.: US 7,300,268 B2
Dooley et al.  (45) Date of Patent: Nov. 27, 2007

(54) LOW-DENSITY PART INJECTION MOLDING SYSTEM

(75) Inventors: David J. Dooley, Troy, MI (US); Glenn A. Cowelchuk, Chesterfield Township, MI (US); Todd L. DePue, Brighton, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/306,079

(22) Filed: Dec. 15, 2005

(65) Prior Publication Data

US 2007/0138684 A1 Jun. 21, 2007

(51) Int. Cl.
*B29C 44/16* (2006.01)

(52) U.S. Cl. ..................... 425/4 R; 425/577
(58) Field of Classification Search ................ 425/4 R, 425/817 R, 577; 264/328.7
See application file for complete search history.

(56) References Cited

U.S. PATENT DOCUMENTS

| | | | |
|---|---|---|---|
| 4,816,313 A | | 3/1989 | Hosokawa et al. |
| 5,151,277 A | * | 9/1992 | Bernardon et al. ......... 425/112 |
| 5,407,991 A | | 4/1995 | Hikasa et al. |
| 6,179,599 B1 | * | 1/2001 | Venrooij et al. ............ 425/116 |
| 6,368,701 B1 | * | 4/2002 | Nomura et al. ............. 428/218 |
| 6,403,014 B1 | * | 6/2002 | Hendry et al. .............. 264/500 |
| 6,544,449 B1 | | 4/2003 | Gardner |
| 6,652,254 B2 | | 11/2003 | Shimura et al. |
| 6,790,020 B2 | * | 9/2004 | Kitayama et al. ........... 425/4 R |
| 6,949,208 B1 | | 9/2005 | Kawauchi et al. |
| 2002/0119289 A1 | | 8/2002 | Czajka et al. |
| 2004/0094986 A1 | | 5/2004 | Landvik et al. |
| 2004/0113322 A1 | | 6/2004 | Grimmer et al. |

* cited by examiner

*Primary Examiner*—Robert Davis
*Assistant Examiner*—Marissa W Chaet
(74) *Attorney, Agent, or Firm*—Earl LaFontaine

(57) ABSTRACT

An injection molding system (10) includes a first mold half (20) and a second mold half (22), which forms a cavity (23) with the first mold half (20). A cavity intrusion element (34) is displaceable to extend within the cavity (23). A displacement mechanism (36) is coupled to the cavity intrusion element (34). A controller (38) is coupled to the displacement mechanism (36) and controls the intrusion depth (D) of the cavity intrusion element (34) during an injection molding process. A method of forming an article includes the pressurizing of the cavity (23) within a mold (14) via a gas. A material having a blowing agent is injected into the cavity (23). The gas pressure within the cavity (23) is released. The cavity intrusion element (34) is backed out from within the cavity (23). The material is cured.

5 Claims, 4 Drawing Sheets

LOW-DENSITY PART INJECTION MOLDING SYSTEM

TECHNICAL FIELD

The present invention relates to injection molding processes and systems, and more particularly, to techniques for forming low-density injection molded parts.

BACKGROUND OF THE INVENTION

Expansion-molded articles of thermoplastic resin can be prepared by a process wherein a chemical blowing agent or a gas, such as chlorofluorocarbon, butane, pentane, carbon dioxide or nitrogen, is directly supplied to and dissolved in the resin. The gas is incorporated into the molten resin and then the resin is injected into a mold. The blowing agent causes the resin to expand in the mold to form a part.

Various parts may be formed using the above-stated injection/foam molding process. For example, many in-vehicle armrests are currently formed using the stated process. Although the stated process provides a quick, inexpensive, and efficient technique for the high production of parts, the current systems utilized to form the parts are limited in their ability to adjust the density and density profile of the formed parts.

The material density of the parts can correlate to the stiffness and feel of those parts. The material density of the parts can also correlate to or affect the conforming or compliant nature of the parts, as well as the rebound response or ability of the parts to return to their original states and shapes. As such, part design versatility is also limited.

Some techniques currently exist for reducing the density of an injection/foam molded part. The techniques include increasing the volume of the utilized mold by moving the core half of the mold away from the cavity half of the mold. Although this increases the volume in which the part may expand, thus reducing the density of the part, this is not always feasible for complex part shapes. Also, the stated technique is limited in providing isolated or variable adjustment capability of material part densities.

Thus, there exists a need for an improved injection/foam molding process that provides increased ability in controlling the density and density profile of parts produced therefrom.

SUMMARY OF THE INVENTION

In one embodiment of the present invention, an injection molding system is provided that includes a first mold half and a second mold half, which forms a cavity with the first mold half. A cavity intrusion element is displaceable to extend within the cavity. A displacement mechanism is coupled to the cavity intrusion element. A controller is coupled to the displacement mechanism and controls the intrusion depth of the cavity intrusion element during an injection molding process.

Another embodiment of the present invention provides a method of forming an article. The method includes pressurizing a cavity within a mold via a gas. A material having a blowing agent is injected into the cavity. The gas pressure within the cavity is released. A cavity intrusion element is backed out from within the cavity and the injected material is cured.

The embodiments of the present invention provide several advantages. One such advantage is the ability to increase the volume within a mold cavity during the injection molding process and to have precise control over and where such increase occurs. This allows for precise control over the density profile of a part.

Another advantage provided by an embodiment of the present invention is the ability to adjust the volume within a cavity of a mold during an injection molding process without movement of the associated mold halves. This allows for density profile control and formation of complex shaped parts.

The above-stated embodiments allow for parts to be produced with reduced density and thus, in the case of an interior vehicle part, parts that provide improved feel and comfort as perceived and actually experienced by a vehicle occupant.

The present invention itself, together with further objects and attendant advantages, will be best understood by reference to the following detailed description, taken in conjunction with the accompanying drawing.

BRIEF DESCRIPTION OF THE DRAWINGS

For a more complete understanding of this invention reference should now be had to the embodiments illustrated in greater detail in the accompanying figures and described below by way of examples of the invention wherein.

DETAILED DESCRIPTION

Figure 1:
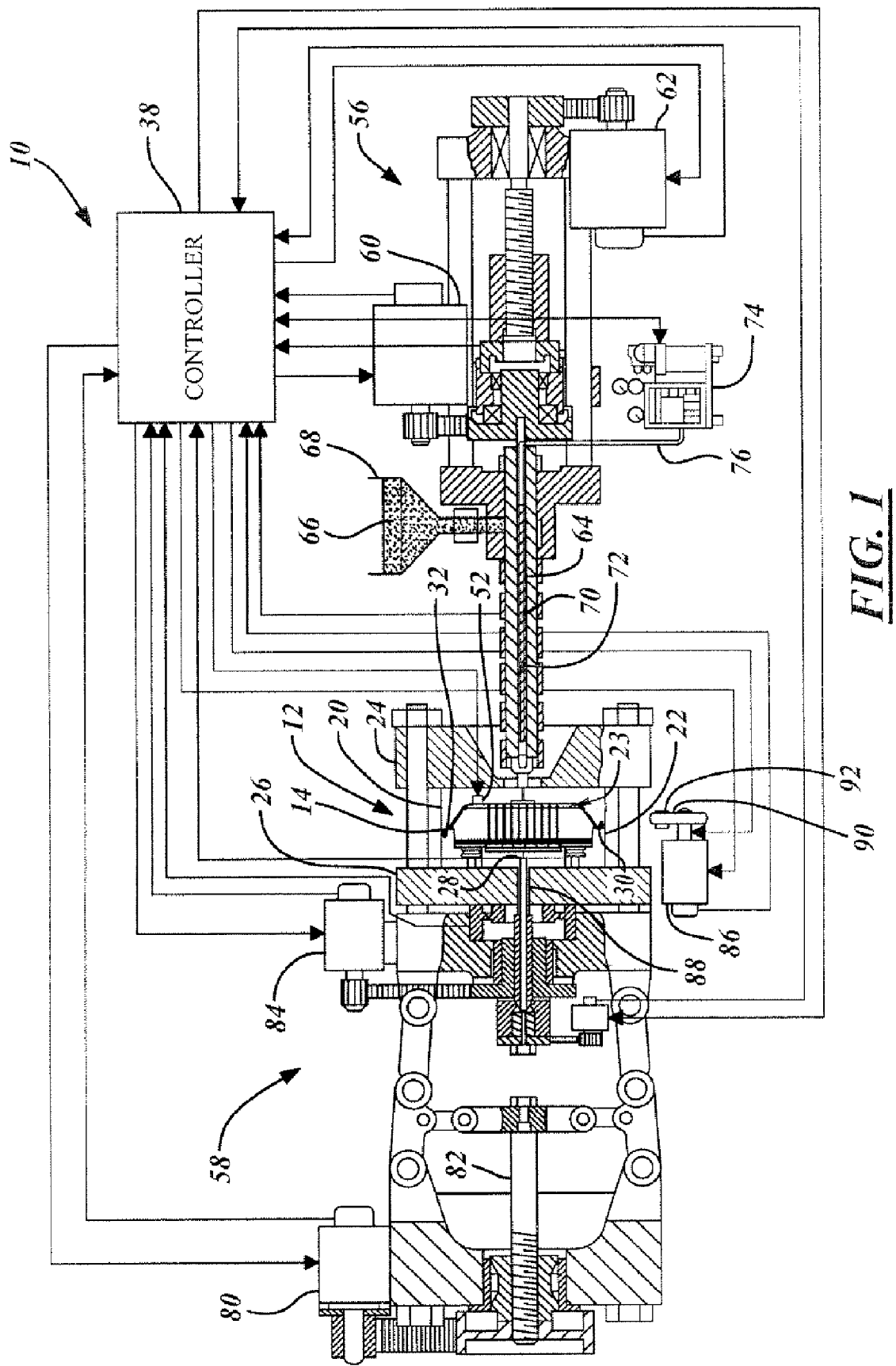
FIG. 1 is a side sectional view of an injection molding system incorporating a density adjustment system in accordance with an embodiment of the present invention.

In each of the following figures, the same reference numerals are used to refer to the same components. While the present invention is described primarily with respect to an injection molding system and method, the present invention may be adapted to various molding processes, such as compression molding, die casting, and other molding and casting processes that utilize injection molding and/or foam molding principles. The present invention may be applied to molds used to form complex shaped and deep contoured components, such as instrument panels, bumpers, door panels, interior trim panels, and other components known in the art. The present invention may apply to automotive, aeronautical, nautical, railway, commercial, and residential industries, as well as to other industries that utilize similar molding processes.

In the following description, various operating parameters and components are described for one constructed embodiment. These specific parameters and components are included as examples and are not meant to be limiting.

Referring now to FIG. 1, a side sectional view of an injection molding system 10 incorporating a density adjustment system 12 in accordance with an embodiment of the present invention is shown. The density adjustment system 12 is incorporated into a mold 14 and is used to adjust the density profile of an article under formation. The article when cured may be in the form of a skin, a part, or other injection-molded item known in the art. The mold 14 has a cavity mold half 20 and a core mold half 22 that form a cavity 23 therebetween. The cavity mold half 20 is mounted on a stationary platen 24. The core mold half 22 is mounted on a moveable platen 26 that is translated along a mold closing line 28. The core mating surface 30 of the core mold half 22 remains parallel to the cavity mating surface 32 of the cavity mold half 20 during actuation thereof. The mold closing line 28 extends perpendicular to the mating surfaces 30 and 32. The cavity mold half 20 and the core mold half 22 may be mounted on either of the platens 24 and 26.

Figure 2:
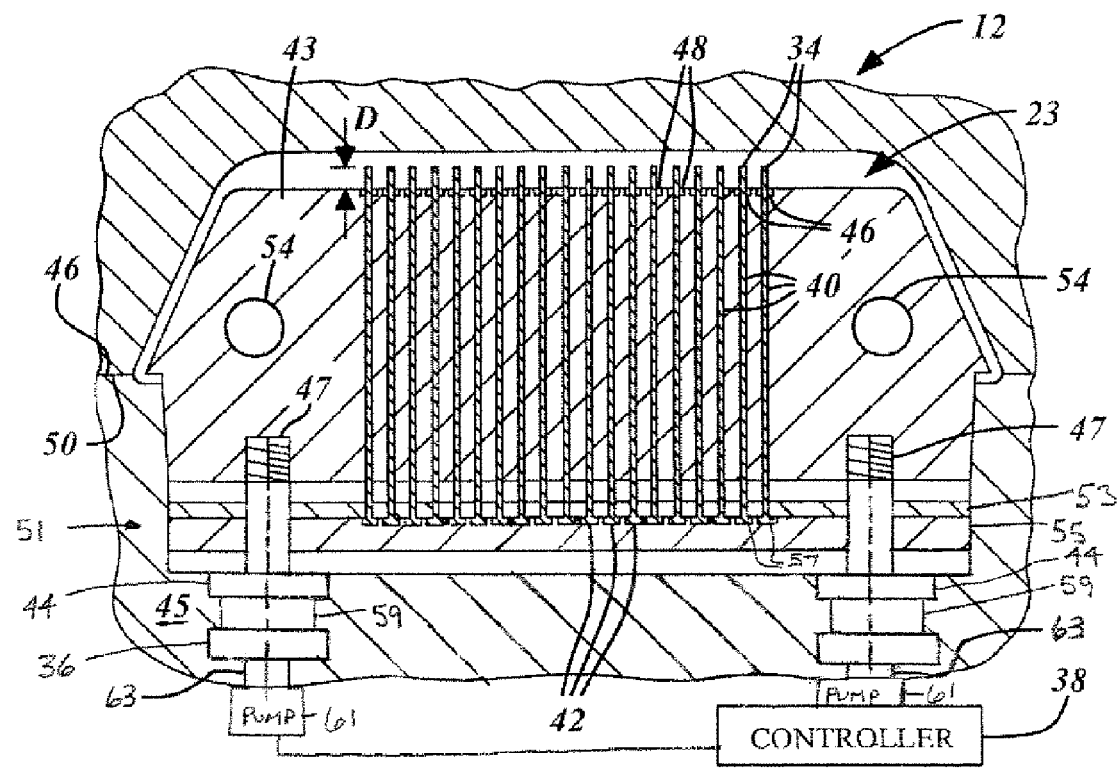
FIG. 2 is a side cross-sectional view of the density adjustment system of FIG. 1 during initialization of an injection molding process.
Figure 3:
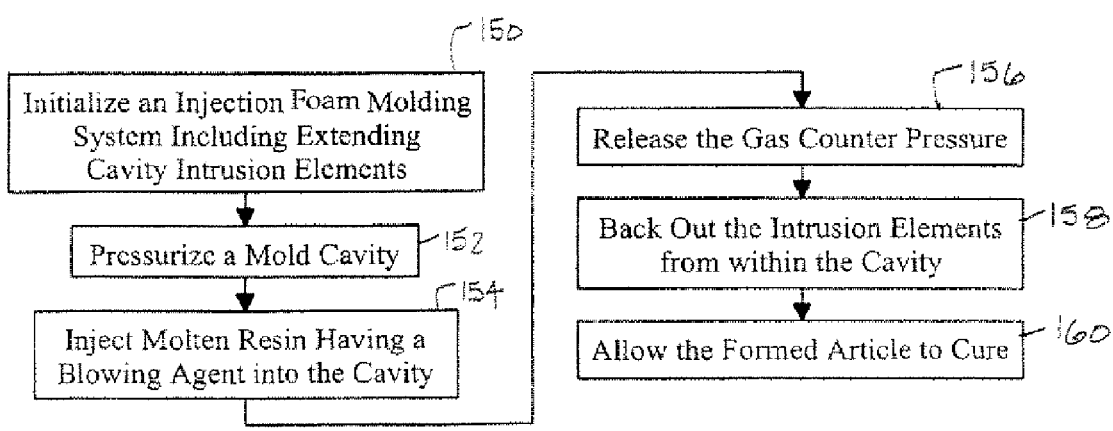
FIG. 3 is a logic flow diagram illustrating a method of forming an article in accordance with an embodiment of the present invention.

Referring now to FIG. 2, a side cross-sectional view of the density adjustment system 12 is shown. The density adjustment system 12 includes one or more cavity intrusion elements 34 that are displaceable to extend within the cavity 23. A displacement mechanism 36 is coupled to the intrusion elements 34. A controller 38 is coupled to the displacement mechanism 36 and controls the displacement operation of the intrusion elements 34. The controller 38 translates and adjusts the intrusion depths D of each of the intrusion elements 34 during an injection molding process. This is further described in more detail below.

The intrusion elements 34 may be in the form of pins, as shown, or may be in some other form as would be readily envisioned by one skilled in the art. Any number of intrusion elements may be used. The intrusion elements 34 may be of various size and shape and may be located anywhere on the cavity mold half 20 and the core mold half 22. The intrusion elements 34 may also be oriented in various patterns across the cavity 23. The intrusion elements 34 shown are mounted on the core mold half 22 and have shafts 40 and heads 42. The shafts 40 extend through a portion of the core mold half 22. The heads 42 are attached to the displacement mechanism 36.

The displacement mechanism 36 includes one or more actuators 44. The actuators 44 may be attached to the intrusion elements 34 individually, in groups, in sets, or in any combination thereof. A single actuator may be coupled to any number of the intrusion elements 34 depending upon the desired level of density adjustability. For increased control and accuracy over the density profile of an article, an increased number of intrusion elements and an increased number of individual actuators are used. The actuators 44 may be pneumatically, hydraulically, pneudraulically, or electronically controlled and as such may include or have associated therewith various pneumatic, hydraulic, pneudraulic, and/or electronic devices, which may be incorporated using techniques known in the art.

Figure 4:
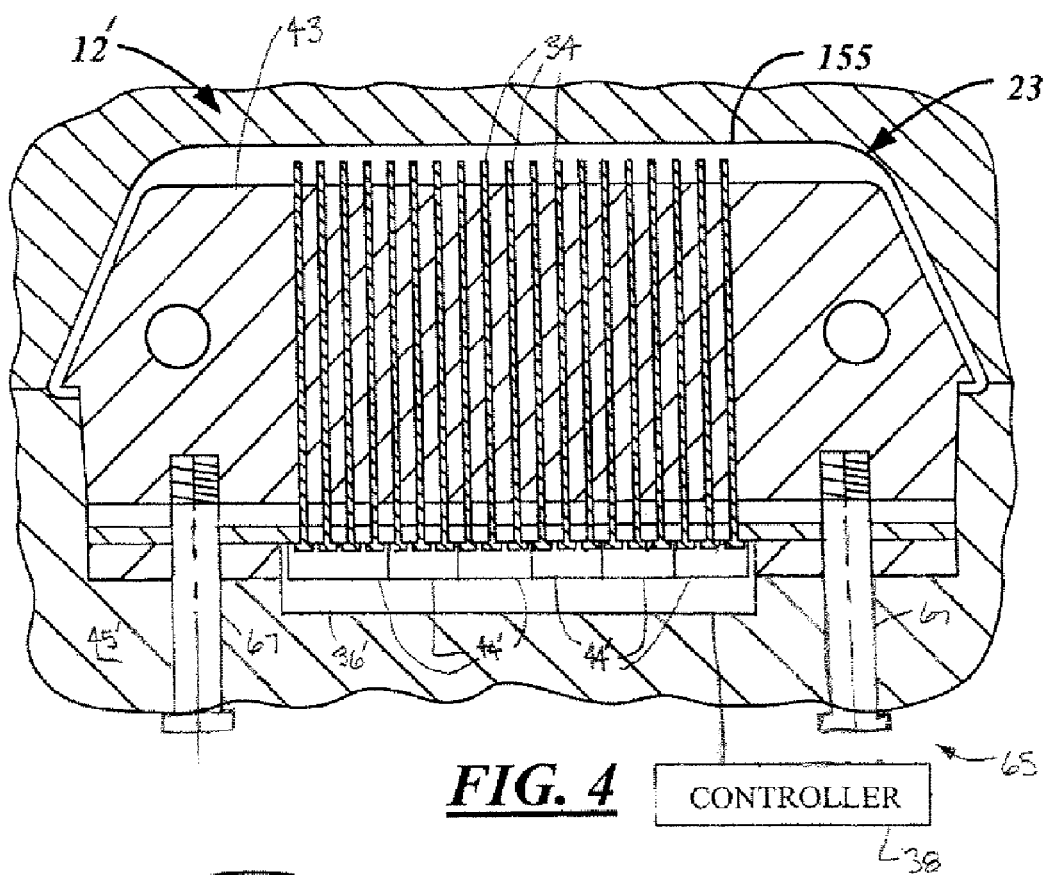
FIG. 4 is a side cross-sectional view of a density adjustment system during a material injection stage of the injection molding process in accordance with another embodiment of the present invention.

Two example displacement mechanisms architectures are shown, one in FIG. 2 and another in FIG. 4. In FIG. 2, a dual plate hydraulic configuration 51 is shown. The dual plate configuration 51 includes a mounting plate 53 and a holding plate 55. The intrusion elements 34 inserted into holes 57 in the mounting plate 53 and are held in position relative to the mounting plate 53 via the holding plate 55. The holding plate 55 is fastened to the mounting plate 53. Hydraulic cylinders 59 are coupled within the mold halves 20 and 22, such as in the base portion 45, and to the plates 53 and 55. The hydraulic cylinders 59 are actuated to slide the plates 53 and 55 along the shafts 47 in order to translate the intrusion elements 34. The shafts 47 may be threaded and coupled to the density adjustment system portion 43. The hydraulic cylinders 59 are actuated via hydraulic pumps 61, which are coupled to the controller 38. The hydraulic pumps 61 are coupled to the hydraulic cylinders 59 by hydraulic lines 63, which may be of various length and extend out and away from the mold halves 20 and 22.

In FIG. 4, a density adjustment system 12' is shown that is similar to the density adjustment system 12, but has an intrusion element selective configuration 65, as opposed to the dual plate configuration 51. The selective configuration 65 also includes displacement mechanisms 36' and actuators 44'. The actuators 44', as shown are attached to the intrusion elements 34 in sets of three or four. Note that this is for example purposes only, the actuators 44' may be attached to the intrusion elements 34 individually or in other selective sets. The controller 38 is coupled to the displacement mechanism 36'. The controller 38 may be directly coupled to each of the actuators 44'. As shown, the density adjustment system portion 43 is attached to the base portion 45', via the fasteners 67. In this stated embodiment, the density adjustment system portion 43 and the base portion 45' may be separate components, as shown, or may be in the form of a single unitary structure.

The controller 38 may be microprocessor based such as a computer having a central processing unit, memory (RAM and/or ROM), and associated input and output buses. The controller 38 may be an application-specific integrated circuit or may be formed of other logic devices known in the art. The controller 38 may be a portion of a central main control unit, a valve gate controller, a control circuit having a power supply, or may be a stand-alone controller as shown. Although a single controller is shown, multiple controllers may be utilized.

Referring again and also to FIG. 1, the mold haves 20 and 22, as described above, are configured for the incorporation of the density adjustment system 12. The core mold half 22 includes the density adjustment system portion 43 and the base portion 45. The density portion 43 is attached to the base portion 45 via the shafts 47 and the hydraulic cylinders.

In addition to the incorporation of the intrusion elements 34 in the core mold half 22, the mold halves 20 and 22 have seals 46 to prevent escape of pressurized gas within the cavity 23. The seals 46 may be located between the intrusion elements 34 and the mold halves 20 and 22. A seal may also be utilized between the mold halves 20 and 22. Other seals may be utilized between one of the mold halves 20 and 22 and any gas inlet channel, such as the gas supply channel 70 below described. The seals may, for example, be in the form of gaskets or o-rings, or may be formed via airtight configurations of components, such as between the mold halves 20 and 22. In the embodiment shown, seals 48 are shown between the intrusion elements 34 and the core mold half 22. In addition, the mold halves 20 and 22 are pressed together forming an airtight seal 50.

The mold halves 20 and 22 further include one or more gas pressure release valves 52 (only one is shown). The gas pressure release valves 52 may be located anywhere on the mold halves 20 and 22 and around the cavity 23. The gas pressure release valves 52 are coupled to and controlled by the controller 38.

The mold halves 20 and 22 may in addition have internal cooling associated therewith. For example, as shown, the core mold half 22 has internal cooling lines 54. A cooling fluid may be circulated through the cooling lines 54. The cooling lines 54 are attached to a cooling circuit (not shown).

The injection molding system 10 is shown for example purposes only. The injection molding system 10 includes an injection side 56 and a die/part actuation side 58, which are controlled by the controller 38. The injection side 56 includes a rotation servo motor 60 and an injection servo motor 62, which are coupled to and are used to rotate and translate a screw 64. The rotation and translation of the screw 64 causes the resin material 66 from within a hopper 68 to be injected into the mold 14. The injected resin 66, through applied heat and pressure, cures to form a part.

The screw 64 has a gas supply channel 70 extending longitudinally therethrough. The gas supply channel 70 has a check valve 72 for preventing molten resin 66 from ingressing into the gas supply channel 70. A gas injector 74 is coupled to the gas supply channel 70 via a gas inlet pipe 76. The gas supply channel 70 and gas injector 74 are used to pressurize the cavity 23 and to inject and mix a blowing agent into the molten resin 66. Although one gas supply channel is shown, multiple gas supply channels may be utilized and the gas supply channels may direct gas directly into the cavity 23 and not through the screw 64. The gas injector 74 is coupled and controlled by the controller 38.

The die/part actuation side 58 includes a die actuation motor 80, which is used to open and close the mold 14. The die actuation motor 80 is coupled to the moveable platen 26 via a drive shaft 82. The die actuation motor 80 rotates the drive shaft 82 to translate the core mold half 22, thus, opening or closing the mold 14. The die/part actuation side 58 may also include a part separation motor 84 and a part removal motor 86. The part separation motor 84 is coupled to an ejection member 88, which is used to separate the part from the core mold half 22 upon forming and cooling of the part. The part removal motor 86 is coupled to a part removing arm 90 and a pad 92. The pad 92 is used to grab the part and remove it from the mold 14 upon curing thereof.

During operation of the injection molding system 10, the mold 14 is closed by translating the core mold half 22 towards the cavity mold half 20. After the mold 14 is completely closed, the material 66, which may be in the form of a thermoplastic, thermosetting resin, or thermoplastic elastomer, is injected into the cavity 23. Heat may be continuously applied until the injected material is cured to form the part.

Although FIGS. 2-7 are described primarily with respect to the formation of a soft skin that is formed of a thermoplastic elastomer material, FIGS. 2-7 are provided solely for example purposes. The present invention may be applied and easily modified to form other articles of various other materials and material combinations. Referring again to FIG. 2 and now also to FIG. 3, in which a logic flow diagram illustrating a method of forming an article in accordance with an embodiment of the present invention is shown.

In step 150, the injection molding system 10 is initialized. The mold halves 20 and 22 are brought together and the intrusion elements 34 are extended within the cavity 23. The extension of the intrusion elements 34 into the cavity 23 reduces the volume of the cavity 23. Although in FIG. 2, all of the intrusion elements 34 are shown as having the same intrusion depth D, the intrusion depths of each intrusion element 34 may vary depending upon the application and the article being formed. In step 152, the cavity 23 is pressurized for the gas counter pressure process. The controller 38 activates the gas injector 74 to supply gas into the cavity 23. The cavity 23 may be pressurized to a pressure approximately between 10-2000 psi. As an example, the pressure cavity 23 may be pressurized to approximately 200 psi. The type of gas injected into the cavity 23 may be nitrogen or some other suitable gas.

Referring now to FIG. 4, a side cross-sectional view of the density adjustment system 12 during a material injection stage of the injection molding process is shown. In step 154, material 155, which may be in the form of a molten resin having a blowing agent contained therein, is injected into the cavity 23. The blowing agent may include citrates, azides, or other known blowing agents. A predetermined and controlled amount of molten resin is injected into the cavity 23. In one embodiment, the amount of resin material is metered to be within approximately 0.5%-4% by weight. In step 156, the gas counter pressure is released towards the end of the injection of the material 155, as performed in step 154. The release of the gas counter pressure causes the blowing agent to expand, thereby, filling the remainder of the cavity 23. FIG. 4 illustrates the cavity 23 filled by the molten resin and the blowing agent.

Figure 5:
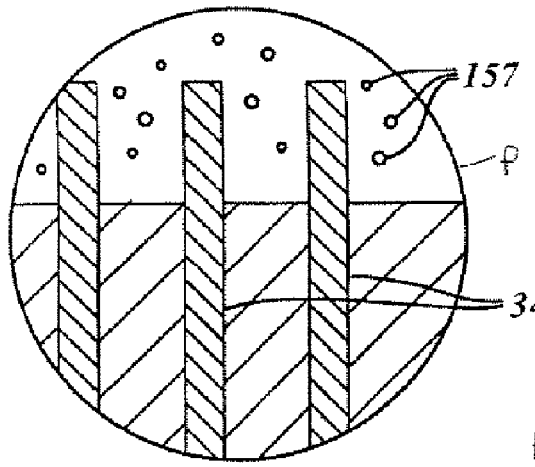
FIG. 5 is a close-up cross-sectional view of an intrusion portion of the density adjustment system illustrating foam cell distribution prior to cavity volume expansion.

Referring now also to FIG. 5, a close-up cross-sectional view of an intrusion portion P of the density adjustment system 12 illustrating foam cell distribution prior to cavity volume expansion is shown. Foam cells 157 are shown. Note that a small number of foam cells per cubic volume exist and that, in general, the size of the foam cells is small.

Figure 6:
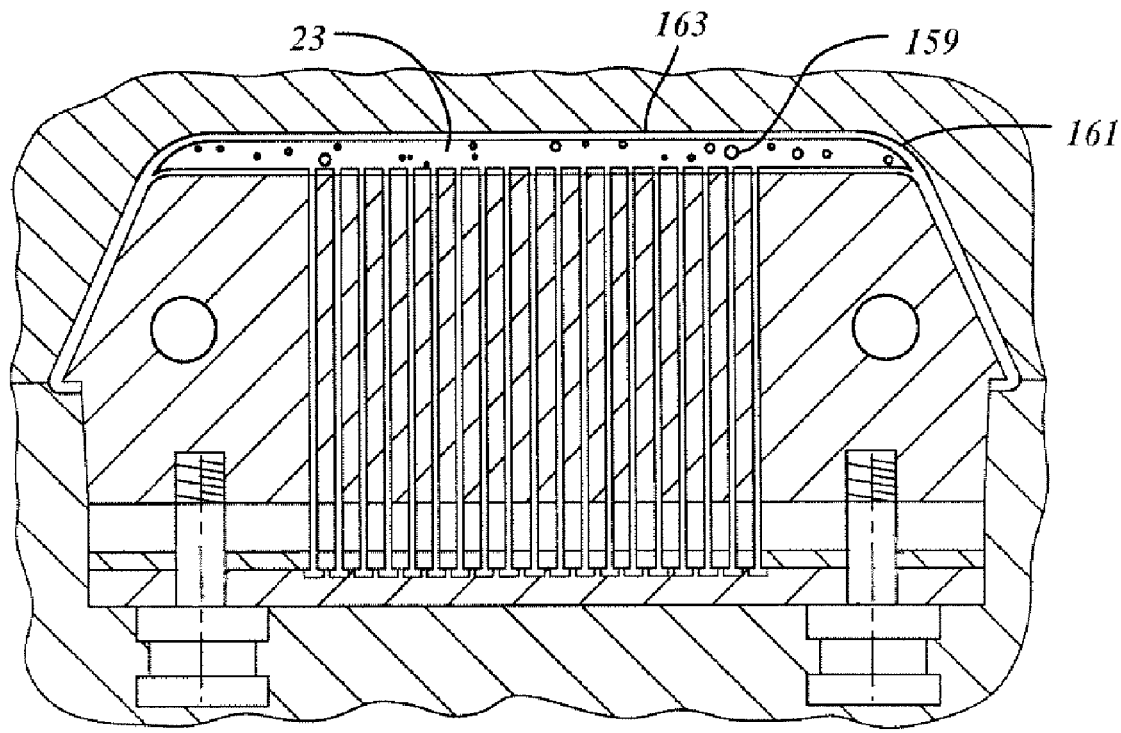
FIG. 6 is a side cross-sectional view of the density adjustment system of FIG. 1 during a cavity volume expansion stage of the injection molding process.

Referring now to FIG. 6, a side cross-sectional view of the density adjustment system 12 during a cavity volume expansion stage of the injection molding process is shown. In step 158, the intrusion elements 34 are retracted or backed out of the cavity 23. The intrusion elements 34 may be retracted at varying rates and in various orders. The layout of the intrusion elements 34 across the cavity 23, the rate of retraction, and the order in which the intrusion elements 34 are retracted dictates the density profile of the formed article. In backing out the intrusion elements 34 the volume within the cavity 23 increases. This increase in volume allows the foam cells 159 created by the blowing agent to expand. The skin 161 includes the foam core 159 and the outer shell 163. The foam core 159 is composed of the resin material and the blowing agent, whereas the outer shell 163 is primarily composed of the resin material.

Figure 7:
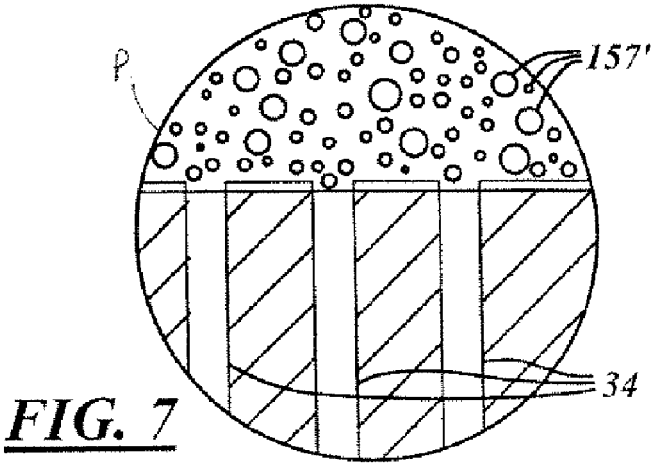
FIG. 7 is a close-up cross-sectional view of the intrusion portion shown in FIG. 5 illustrating foam cell distribution after cavity volume expansion.

Referring now to FIG. 7, a close-up cross-sectional view of the intrusion portion P illustrating foam cell distribution after cavity volume expansion is shown. Notice that the amount and general size of the foam cells 157' is increased to fill up the additional volume provided by the removal of the intrusion elements 34. The increase in number and size of the foam cells 157' decreases the density of the foam core 159 and thus the formed skin 161.

Although the injected material begins to cure upon injection into the cavity 23, the final curing stage of the injection molding process is generally indicated by step 160. After the intrusion elements 34 are retracted the article or, in the example embodiment shown, the skin 161 within the cavity 23 is permitted to cure prior to removal from the mold 14.

Figure 8:
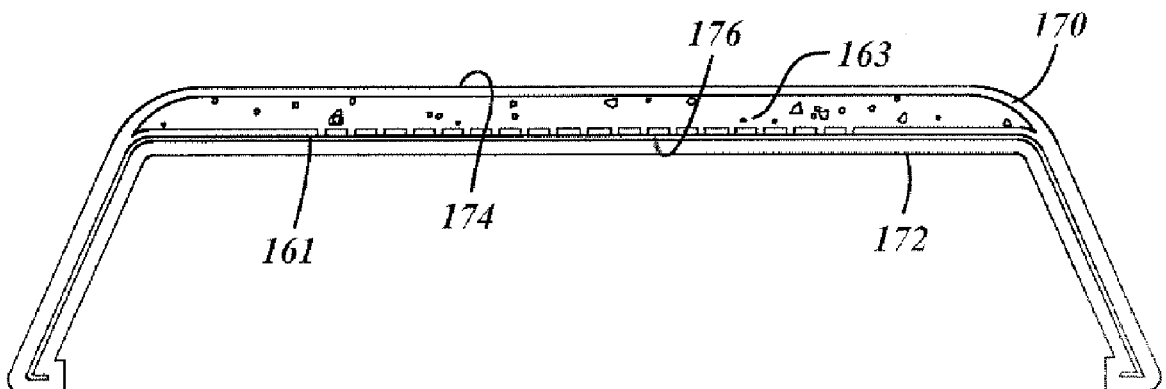
FIG. 8 is a cross-sectional view of a trim panel having a skin formed in general using the system of FIG. 1 and the method of FIG. 3.

Referring now to FIG. 8, a cross-sectional view of a trim panel 170 having the skin 161 formed using an injection molding system, such as the injection molding system 10, and the above-described method is shown. The trim panel 170 includes a substrate or support structure 172, which is covered by the skin 161. The skin 161 has a class "A" outer surface 174 with the soft inner foam core 163. The support structure 172 is a closeout piece that supports and hides the backside 176 of the flexible skin 161.

The above-described steps are meant to be illustrative examples; the steps may be performed sequentially, synchronously, simultaneously, or in a different order depending upon the application.

The present invention provides a system and method of forming injected mold parts with controlled density profiles. The use of intrusion elements and the predetermined layout and intrusion depths, and the retraction control thereof throughout the injection molding process reduces and precisely controls the density within the article being formed. The above-described process reduces the density of a formed article without hindering the surface quality if that article.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An injection molding system for a thermoplastic resin with a blowing agent therein, said system comprising:
   a first mold half;
   a second mold half forming a cavity with said first mold half;
   an injection mechanism for injecting thermoplastic resin with a blowing agent into said cavity;
   a plurality of independently adjustable intrusion elements, each of said intrusion elements displaceable to extend into said cavity and reduce the volume of said cavity;
   a displacement mechanism coupled to said intrusion elements for displacement of said elements into and out of said cavity; and
   a controller coupled to said displacement mechanism and controlling the intrusion of said intrusion elements into and out of said cavity and controlling the depth of intrusion of said intrusion elements into said cavity;
   wherein, said controller controls said displacement mechanism to position a plurality of intrusion elements in said cavity prior to injection of thermoplastic resin with a blowing agent into said cavity, and said controller controls said displacement mechanism to withdraw the plurality of intrusion elements from said cavity after the injection of thermoplastic resin with a blowing agent in order for the blowing agent to expand the thermoplastic resin and entirely fill the cavity,
   wherein, the control of said displacement element, and the intrusion and depth of intrusion of said intrusion elements controls the density of the molded part or portions thereof.

2. The injection molding system as described in claim 1 wherein said displacement mechanism comprises an actuation device selected from one of a pneumatic device, a hydraulic device, a pneudraulic device, and an electronic device.

3. The injection molding system as described in claim 1 wherein said intrusion elements each comprise a pin member.

4. The injection molding system as described in claim 1 further comprising first seal members sealing said intrusion elements relative to one of said first mold half and said second mold half, wherein leakage from the mold of thermoplastic resin with a blowing agent is prevented.

5. The injection molding system as described in claim 1 further comprising at least one gas inlet member and second seal members sealing said gas inlet member, wherein leakage from the mold of thermoplastic resin with a blowing agent is prevented.

* * * * *